United States Patent [19]

O'Connor

[11] Patent Number: 4,585,018

[45] Date of Patent: Apr. 29, 1986

[54] LIQUID DISPENSING COMB

[75] Inventor: Rodney J. O'Connor, College Station, Tex.

[73] Assignee: Texas Romec, Inc., College Station, Tex.

[21] Appl. No.: 591,258

[22] Filed: Mar. 19, 1984

Related U.S. Application Data

[63] Continuation-in-part of Ser. No. 447,297, Dec. 6, 1982.

[51] Int. Cl.[4] .............................................. A45D 24/16
[52] U.S. Cl. .................................... 132/120; 132/112; 132/88.7
[58] Field of Search ....................... 132/120, 108–112, 132/85, 11 R

[56] References Cited

U.S. PATENT DOCUMENTS

| | | |
|---|---|---|
| 633,457 | 9/1899 | Hotze . |
| 1,566,886 | 12/1925 | Lillie .................................. 132/110 |
| 1,597,855 | 8/1926 | Zahorsky ..................... 132/112 UX |
| 2,461,789 | 2/1949 | Usai ..................................... 132/111 |
| 2,922,425 | 1/1960 | Lerner et al. . |
| 3,101,086 | 8/1963 | Vito . |
| 4,013,086 | 3/1977 | Chmela ............................ 132/11 R |
| 4,090,522 | 5/1978 | Donley . |

Primary Examiner—Gregory E. McNeill
Attorney, Agent, or Firm—Baker & Kirk

[57] ABSTRACT

A comb is disclosed that may be used for applying liquid to both scalp and hair and which may is effective regardless of the orientation of the comb. The liquid is retained in the comb in a porous wick-like material and the liquid dispensing teeth are a porous wick-like material so that capillary action ensures a continuous, regulated flow of liquid regardless of the orientation of the comb.

6 Claims, 4 Drawing Figures

U.S. Patent   Apr. 29, 1986   4,585,018
FIG. 1
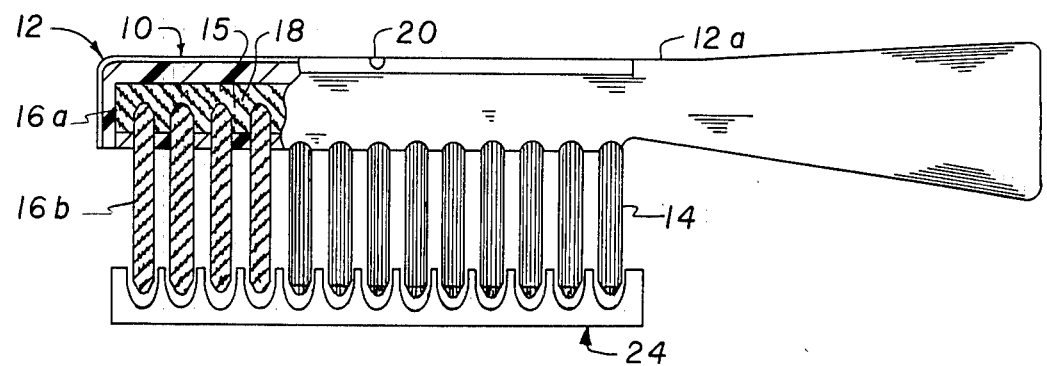
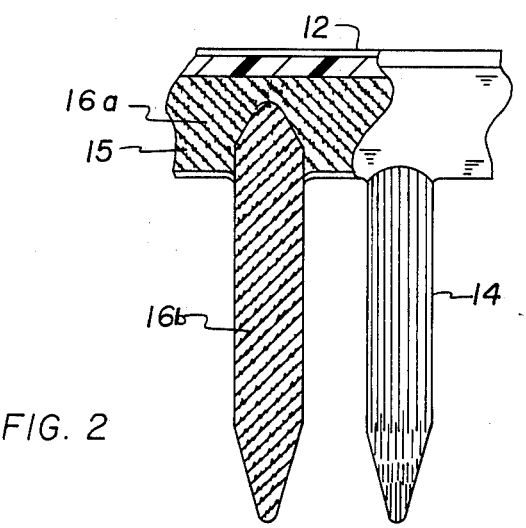
FIG. 2
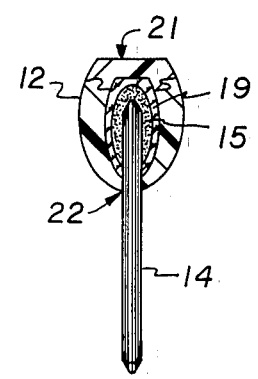
FIG. 4
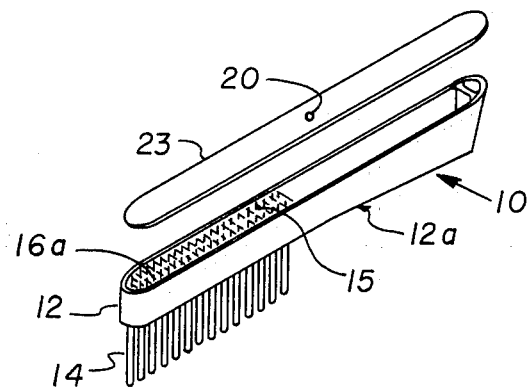
FIG. 3

LIQUID DISPENSING COMB

SPECIFICATION

This application is a Continuation-In-Part of my co-pending application Ser. No. 447,297 filed Dec. 6, 1982.

BACKGROUND OF THE INVENTION

The present invention relates to a device incorporating a disposable liquid dispensing component, and more particularly, to combs for applying liquids, such as medications, grooming preparations or cleansing agents, uniformly to the scalp of animals having hair, or fur, where the device will effectively dispense the liquid uniformly onto the hair and skin of such animal while combing the hair regardless of the position or orientation of the comb.

Such combs provide a better method for applying liquid treatments to hair and skin than the present most common methods of spraying, sponging or dipping, in that the comb eliminates wastage of excess liquid, avoids possible contamination of the user or of the environment by liquid spillage or by inhalation of aerosol spray, and ensures uniform application of the liquid to the desired areas. The latter is a particular advantage for certain uses with animals having a dense inner fur with an outer layer of hair, such as a Saint Bernard dog, that resists liquid penetration to the skin except when exceptional care is taken to ensure thorough saturation. Still a further advantage of the combs accrues in their use with many animals that find being combed a pleasant sensation, but strongly resist being sprayed, powdered, sponged or dipped. In such cases, use of the comb reduces the risk of the animal's handler being scratched or bitten during liquid treatment of the animal. A particular problem has been ridding domestic animals of pesky fleas. The liquid dispensing comb of the instant invention has been found particularly successful in ridding domestic animals of fleas.

Use of the combs is not limited to animals other than man. Uses with humans include, but are not limited to, treatment of hair-covered tissue with liquids designed to destroy lice, mites and the like, or to treat various skin disorders, and application to hair of dyes, cleaning agents, or grooming aids.

DESCRIPTION OF THE PRIOR ART

A number of combs and brushes for dispensing and applying liquid onto human and other animal hair while grooming the animal are known. Most are combs or brushes which contain a liquid-filled interior chamber in the backbone, from which the liquid passes through the teeth of the comb or through tubes set among bristles of a brush. Uniform delivery of the liquid has not been found to be effectively controlled by these devices. In some, the liquid merely flows out of the opening at a rate determined by the size of the opening and the characteristics, such as viscosity, of the liquid, under the influence of gravity. Others utilize pressure, applied periodically by a squeeze bulb or continuously from an external source supplying liquid through a tube or hose. Some combs involved complicated valves and other controls which fail and impair the operation of the comb, making them less than satisfactory.

The primary problem with dispensing devices heretofore known is that the flow of the liquid through the teeth and onto the scalp, by its nature, depended upon gravitational forces present when the comb or brush was used in an upright manner; i.e., with the teeth pointed downwardly. Such prior devices did not allow effective application of the liquid to areas of the animal in which the comb or brush would not be held in an upright position, for example, in grooming the stomach of an animal, since when the devices were held in an upside-down or sideways position, most of the liquid flowed within the chamber to the backbone of the comb so that little or no liquid was applied to the animal.

In prior art attempts to use liquid dispensing combs for treatment of animals, the apparatus used did not uniformly treat the fur and skin. Difficulties arose because of the layering of animal fur and the oleophilic coating present on animal fur which limited the effectiveness of prior art treatment. The insecticide applied with prior art apparatus tended to migrate to the outer tip of the fur away from the skin of the animal thereby greatly reducing the effectiveness of the treatment causing excessive use of the insecticide.

Also, a major problem with dispensing devices heretofore known is that the flow of the liquid is generally nonuniform onto the receiving surface. In U.S. Pat. No. 4,057,091, for example, a "metered" liquid flow is determined primarily by gravity so that liquid application is maximum for areas in which the comb teeth are pointed essentially downwardly, but flow is zero in areas in which the comb teeth must be pointed upwardly to reach the application area.

U.S. Pat. No. 2,170,550 shows a comb utilizing absorbent pads in the tips of its teeth which serve to apply the liquid directly to the scalp. A cover air-locks the liquid within the backbone and teeth of the comb to prevent the liquid from pouring out through the teeth tips at an uncontrolled speed by means of capillary action of the pads. However, this device does not obviate the problem of the need for continuance of the flow of the liquid when the device is utilized in a non-upright position. When this device is held in an upside-down or sideways position, the liquid would not reach the absorbent pads in the tips of the teeth in order for the liquid to be dispensed.

Often it is desired to apply the liquid to the length of the hairs as well as to the scalp. Devices heretofore known have not been entirely successful in accomplishing the result. Previous attempts to produce a comb which would perform regardless of orientation are described in U.S. Pat. No. 2,376,065 where a bulb in the handle is required and U.S. Pat. No. 3,754,577 where the liquid is supplied from an extended hose. The attempts to apply medication, grooming aids or cleansing agents have been the subject of many patents all of which have been unsatisfactory in one respect or another. Examples of such patents are:

| Pat. No. | Patentee |
|---|---|
| 1,067,051 | J. J. Moore |
| 1,449,096 | F. M. Grieten |
| 1,667,631 | F. C. Mach |
| 2,170,550 | V. G. Corel |
| 2,292,077 | C. E. Holton |
| 2,292,494 | E. S. Tupper |
| 2,336,717 | F. E. Crimmins |
| 2,376,065 | F. Kuszyk |
| 2,513,865 | J. Hazza, et al |
| 2,645,231 | M. O. Decker |
| 3,119,142 | K. E. Fletcher |
| 3,754,557 | P. J. Moore |
| 4,057,901 | G. Bloem |
| 4,090,522 | V. L. Donley, et al |

| Pat. No. | Patentee |
|---|---|
| 4,213,423 | H. A. Bryan, et al |

SUMMARY OF THE INVENTION

Accordingly, because of the above-mentioned problems with prior art combs, the general purpose of the present invention is to provide a comb which may be used for uniformly applying insecticides, medications, cleaning agents or odor neutralizers to an animal's fur and its underlying skin regardless of the orientation of the comb. The comb of my invention may be constructed with a backbone and teeth aligned in the manner expected in a comb. The backbone of the comb will include a cavity, or reservoir means, for storing the liquid to be dispensed. It is the prominent feature of my invention to employ a first porous, wick-like material to retain the liquid in the reservoir and teeth formed of a second wick-like material to draw the liquid from the reservoir to promote the uniform distribution on the fur and scalp. The teeth are made of such second porous wick-like material and adapted such that they may be removably inserted through holes in the backbone to communicate with the first wick-like material soaked with the treating liquid in the reservoir means. The shaft of the dispensing teeth are treated so that the tip and only a portion of the shaft dispense the liquid. It is not necessary that all teeth of the comb of my invention be dispensing teeth. The second wick-like material draws the liquid to be dispensed from the reservoir means to uniformly deposit same on the fur and underlying skin of the animal, regardless of the orientation of the comb.

A wetting agent is preferably added to the insecticide and used to treat the dispensing teeth along with detergent. This stabilizes the emulsion and, with treatment of the teeth, increases the flow of liquid even through tangled and matted fur while inhibiting migration of the insecticide to the fur tip.

Thus, the comb of my invention not only serves both as a container for storing a liquid to be dispensed and as a dispensing applicator, but is easy to use and refill, or throw away, after use. In certain embodiments, the comb can be refilled by pouring liquid directly into the reservoir or by insertion of a disposable cartridge containing the liquid which can be ruptured for dispensing liquid when punctured by teeth removably inserted through holes in the comb backbone. Also, the reservoir may be filled with the liquid and then be permanently sealed by affixing a closure to it.

BRIEF DESCRIPTION OF THE DRAWINGS

FIG. 1 is a side elevation, partially in vertical section, of the present invention.

FIG. 2 is an enlarged side elevation, partially sectioned, showing the dispensing teeth inserted into the backbone of the comb.

FIG. 3 is a perspective view of the preferred embodiment of the invention showing the top to be affixed to close the reservoir means in a separated relationship.

FIG. 4 is a vertical section of an alternate embodiment of the invention showing the teeth penetrating a container of dispensing liquid.

DETAILED DESCRIPTION

Referring now to the drawing in greater detail, in FIG. 1, the comb 10 of the present invention includes a comb backbone 12 having a plurality of removable teeth 14, formed in a conventional comb shape. The backbone 12 and teeth 14 may be made of any suitable material, although plastic lends itself well to economic use, durability and if desired, disposability. Although the preferred configuration is that of a typical comb, more than one row of teeth 14 could be used on a single backbone 12 in a configuration similar to a conventional "curry comb" or brush.

In the present invention, the backbone 12 and teeth 14 have an interior cavity 15, providing a reservoir means for holding a liquid 18 to be dispensed. The cavity 15 is substantially packed or filled with porous wick-like material 16a such as nylon, felt, cotton, porous polyethylene, and the like, but preferably polypropylene non-oriented-fiber felt (Aeropak [R] Style #802 from Supreme Felt and Abrasives Co., 4425 James Place, Melrose Park, IL 60160) to provide a wick action within the comb 10 regardless of the position of the comb 10 to replace the liquid 18 removed during use with liquid 18 held in the reservoir means 15 of the comb 10. The backbone 12 includes a hole 20 which can allow air to replace the liquid withdrawn during use or may be used as a filling means. A cap may be included to close such hole 20.

The size of the cavity 15 allows for a pre-measured amount of liquid 18, and thus the size of the cavity may be varied according to desired capacity. In the preferred embodiment as shown in FIG. 3, about 6 ml. of insecticide is used to fill the reservoir. This amount of insecticide has been found to be sufficient to treat a Saint Bernard dog two to four times for removal of fleas and with proportionate increase in treatments for smaller dogs.

The porous wick-like material 16b of the teeth 14 may be a foam, a fabric, a bundle of fibers, or other material that draws liquid through itself by capillary action.

While teeth 14 may be made from various materials, such as nylon or polyethylene, or the like, teeth 14 are preferably a nylon fiber often incorporating a binder such as an acetate resin. The preferred materials are nylon "nibs" of the type used for so called "felt tip pens" which is a nylon staple (non-continuous) fiber sold as Microrite (R) Plastic Tips (PT 3001-1) by Bacon Felt Co., Inc., 102 Old Colony Avenue, East Taunton, MA 02718. Preferably, the above-mentioned nibs are treated by use of heat and a wash liquid comprising a wetting agent in an aqueous solution to partially melt the exterior of the nib to at least partially seal the sides to direct most, but not all, liquid flow to the tips of the teeth 14. The heat treatment is easily practiced by those skilled in the art with little experimentation and the various parameters can easily be varied to alter the amount of liquid dispensed through the walls of the teeth 14. The treatment with heat and the aqueous wetting agent serves to at least partially fuse the fibers on the outer shaft of the teeth 14 while leaving the interior of the second wick-like material 16b unfused allowing for easy passage of liquid 18 to the animal being treated. Partial fusion of the outer layer is sometimes designed to allow flow of liquid 18 to be dispensed through the side of the shaft of the teeth 14.

The ends of the teeth 14 are preferably ground to a rounded surface at at least one, preferably both, ends in order to allow easier insertion into the backbone 12 and to give better contact with the liquid in the reservoir and to better apply the insecticide through its end without discomfort to the animal.

The optional cartridge 19 (shown in FIG. 4) in the backbone 12 is pierced by the teeth 14 made from a wick-like material 16b so that the liquid 18 held by the first wick-like material 16a can flow from within the reservoir means 15 in the backbone 12 through the teeth 14. The liquid 18 may be a medication, dye, grooming aid, insecticide, odor neutralizer, etc. which may be added through a filling means 20 on the backbone 12 of the comb 10 for introducing liquid 18 into the cavity 15.

For ridding animals of fleas in a preferred embodiment of the invention, the reservoir 18 is filled with a pyrethrin containing mixture well known to those in the veterinary art. One such material is sold as Adams Flea-Off by the Adams Veterinary Research Laboratory in Miami, Fla. and is labeled to contain 0.150 weight percent pyrethrins; 1.5 weight percent piperonyl butoxide; 0.50 weight percent N-Octyl Bicycloheptene Dicarboximide; 0.50 weight percent 2,3:4,5-bis(2-butylene)tetrahydro 2-furaldehyde; 0.60 weight percent petroleum distillate and 96.75 weight percent inert ingredients.

As a treatment of humans for pediculosis, it is preferred that the comb be filled with a material currently sold by a division of Pfizer, Inc. under the trademark "Rid" which is labeled to contain 0.3% pyrethrin, 3.0% piperonyl butoxide; 1.20% petroleum distillate; 2.40% benzyl alcohol with inerts comprising the balance.

For the embodiments of this invention, the filling means 20 may be in any convenient location on the comb 10 and may be designed for reopening (not shown) should it prove desirable to provide for refilling the comb instead of disposing of same when the liquid is exhausted. Alternatively, refilling may be accomplished by use of replacement cartridge 19 to fit into the cavity 15 which is sealed by a sliding top 21 or some other snap-on or commonly used closure configuration. The cartridge 19 once inserted into the cavity 15 and closed therein by securing the top 21, may then be perforated by any convenient means, but preferably, by inserting teeth 15 through holes 22 in the backbone 12 such that the teeth contact the liquid 18 in the cartridge 19 for application through the wick action of the porous material 16b from which the teeth 14 are made.

In the preferred embodiment, especially adaptable as a flea-comb shown in FIG. 3, the liquid 18, in the case of a flea-comb, an insecticide, is poured into the reservoir 15 to saturate the first porous wick-like material 16a, such as a cellulose fiber, but preferably, nonoriented polypropylene felt as hereinbefore mentioned, and the top 23 is secured to the backbone 12 through the application of a suitable adhesive for the material from which the comb 10 is made. It is preferred to permanently affix the top 23 to the backbone 12 when a disposable comb is produced.

Optionally, part of the backbone 12 of the comb 10 may be fabricated to form a handle 12a as an integral part of the backbone 12 and used in its conventional manner. The handle 12a may be of any suitable material although usually, for ease of construction it will be the same material as the backbone 12. A protector 24 may be attached when the comb is not in use to protect the wick-like porous material 16b and inhibit evaporation of the liquid 18 as well. The protector 24 may be of any suitable material, although a clear plastic is preferred. Alternatively, the protector 24 may involve a removable plastic container, such as a closable plastic bag, for all or part of the comb 10.

In the preferred embodiment of this invention, the teeth 14 are made of a rigid porous wick-like material 16b, preferably a nylon as previously described, or a polyester nib of the type used in writing instruments wherein a disposable cartridge 19 is placed in the cavity 15 forming a reservoir means containing liquid 18 and additional porous wick-like material 16a. A porous polyethylene has also been found suitable as far as conducting the liquid is concerned. The cartridge is penetrated by the teeth 14 as shown to allow both the wick-like material 16b of the teeth 14 to communicate with the first wick-like material 16a soaked with the liquid 18.

As the comb 10 is moved transversely over the surface to be treated, regardless of the position or orientation of the comb 10, sufficient amounts of the liquid 18 are deposited on the hair and skin of the animal being treated with replacement liquid 18 being drawn by capillary or wick-like action, of the first material 16a from the backbone 12 of the comb 10 through the second material 16b to skin being treated. The flow of the liquid 18 is continuous when the comb 10 is moved over the surface to be treated and the liquid 18 is effectively applied to both the fur and the underlying skin.

In the above-described manner, the comb 10 may be utilized in upside-down or sideways, as well as upright (with the teeth 14 pointed downwardly) orientations. The wick action of the porous material 16a and 16b tends to remove a dependence upon gravity to cause flow.

The porous material 16a and 16b effectively retards rapid flow of the liquid 18 allowing an even, uniform flow of liquid 18. As the liquid 18 is dispensed, an equivalent amount of liquid 18 is pulled by capillary, wick-like action, through the porous material 16a and 16b to be dispensed.

A liquid dispensing comb of the present invention (FIG. 3) made up of nibs made from nylon staple fibers held by an acetate binder heat treated in the presence of an aqueous wetting agent to limit dispersion through the sides of the shafts was used to apply "Prodip II", a product of Zoecon Industries of Dallas, Tex., to dogs. The insecticide emulsion included alkyl phenoxy polyethoxyethanol ("Triton X-100" produced by Rohm & Haas) as a wetting agent using N-(mercaptomethyl)phthalimide 5-(O,O-dimethyl phosphorodithioate) as the active ingredient in an inorganic aromatic carrier. In using an application technique of pushing the fur backward manually while combing along the root areas, the fur roots and skin were mostly covered and a flea kill of greater than 90% was observed using 1% or less of the amount of insecticide required in normal saturation spraying and probably less than 0.1% of the liquid required for saturation by shampoo or dipping. In treating a dog infested with fleas, dying fleas were observed falling to the floor even while combing continued. The comb of this invention has been tested on a number of different animals to kill fleas with the same surprising success as set forth above.

While variations and modifications of the detailed construction may be obvious in view of the foregoing description of this invention, it is understood that such changes will be within the spirit and scope of the present invention as is defined by the appended claims.

I claim:

1. A liquid dispensing comb which comprises:
   a comb backbone having:

an interior cavity enclosing a first porous material for containing liquid to be dispensed; and a plurality of teeth communicating with said cavity, wherein at least some of said teeth are of a second rigid porous wick-like material treated to control porosity of at least a portion of the shaft of said treated teeth and where flow of said liquid is substantially continuous when said comb is moved transversely over the skin of the animal to be treated, regardless of the orientation of said comb, whereby said liquid is applied simultaneously to hair and skin.

2. The liquid dispensing comb of claim 1, wherein said first porous wick-like material is a polypropylene fiber felt.

3. The liquid dispensing comb of claim 1, wherein said second porous wick-like material is a rigid nylon staple fiber ground to a rounded surface at at least one end.

4. The liquid dispensing comb of claim 1, wherein said teeth are removably inserted in openings in the backbone to communicate with said first porous wick-like material in said cavity.

5. An improved liquid dispensing comb of the type having a backbone cavity for containing liquid to be dispensed and a plurality of liquid dispensing teeth wherein the improvement comprises:

a cavity for retaining liquid in a first porous wick-like material comprising a nonoriented polypropylene or polyester felt shaped to fit said cavity; and a plurality of liquid dispensing teeth, in communication with said cavity made of a second porous wick-like material comprising a nylon staple fiber nib treated to direct liquid being dispersed through the tips of said teeth, and where flow of said liquid is substantially continuous when said comb is moved transversely over the surface to be treated, regardless of the orientation of said comb, whereby said liquid is applied simultaneously to hair and skin.

6. The improved liquid dispensing comb of claim 5, wherein said liquid dispensing teeth are removably inserted in openings in the backbone to communicate with said first porous wick-like material in said cavity.

* * * * *